United States Patent

[11] 3,587,908

| | | |
|---|---|---|
| [72] | Inventor | Donald L. Nickel |
| | | Monroeville, Pa. |
| [21] | Appl. No. | 817,920 |
| [22] | Filed | Apr. 21, 1969 |
| [45] | Patented | June 28, 1971 |
| [73] | Assignee | Westinghouse Electric Corporation |
| | | Pittsburgh, Pa. |

[54] PROTECTIVE AND COOLING COVER OR HOUSING FOR SEMIBURIED ELECTRICAL APPARATUS
6 Claims, 6 Drawing Figs.

[52] U.S. Cl.............................................. 220/4,
98/37, 174/16, 220/18, 336/59, 336/65
[51] Int. Cl...................................................... F24f 7/00,
B65d 25/24, B65d 7/18
[50] Field of Search............................................ 220/4, 18,
(Vents), 44 (A); 336/59, 65; 174/16, 37, 50;
98/37, 121

[56] References Cited
UNITED STATES PATENTS

| | | | | |
|---|---|---|---|---|
| 3,087,410 | 4/1963 | Averill.......................... | 98/121(X) |
| 3,287,566 | 11/1966 | Lang............................ | 174/37(X) |
| 3,426,667 | 2/1969 | Johnson....................... | 98/37 |

FOREIGN PATENTS

| | | | | |
|---|---|---|---|---|
| 1,034,406 | 7/1958 | Germany...................... | 220/4 |

Primary Examiner—George E. Lowrance
Attorneys—A. T. Stratton and F. E. Browder

ABSTRACT: A protective and cooling cover or housing for partially buried distribution transformers comprising a plurality of substantially identical ringlike members mounted one on the other and spaced from each other by spacing members with a top member mounted on top of the uppermost ring member. Each of the ring members has a downwardly extending outer portion for directing air into the cover or housing and also preventing rain or snow or the like from entering the cover or housing and a downwardly extending inside portion for directing air downward onto an enclosed transformer and also to prevent foreign objects from being inserted into the cover or housing.

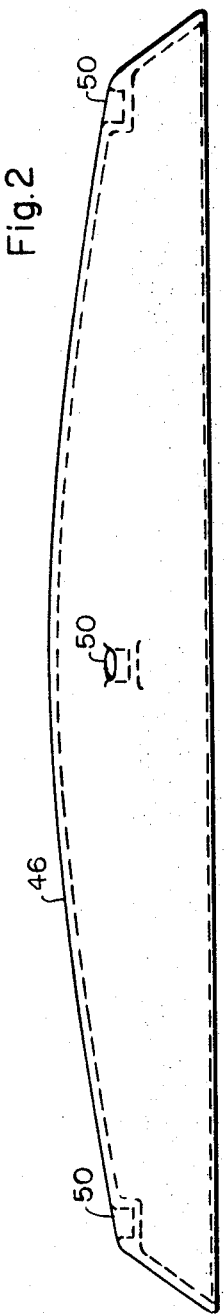
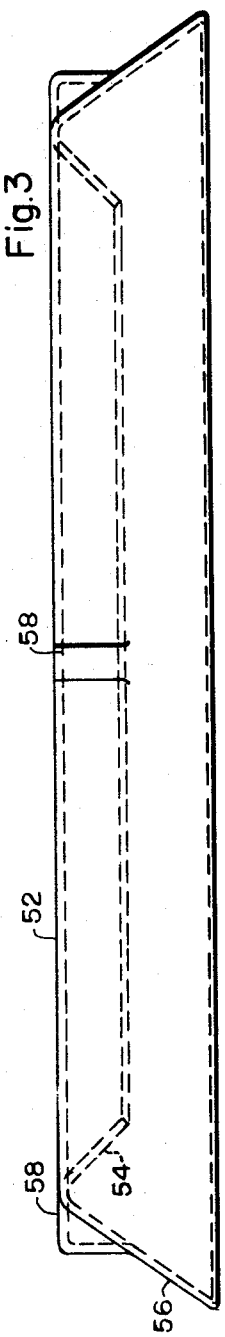
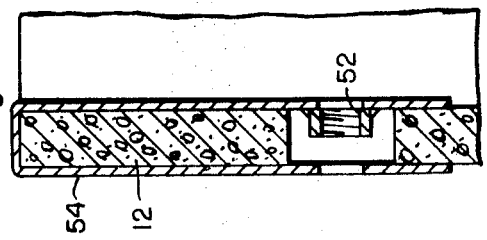
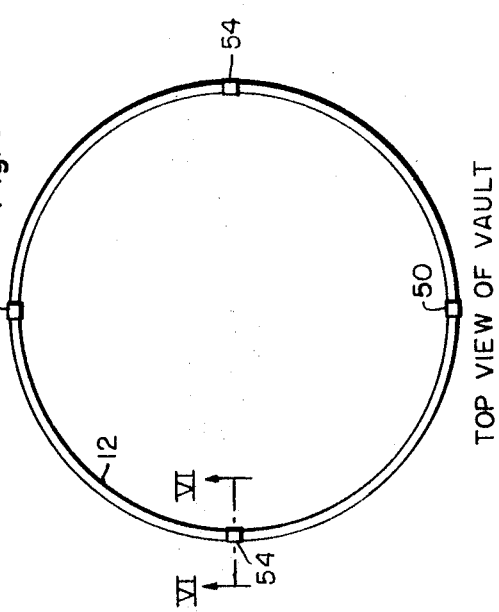
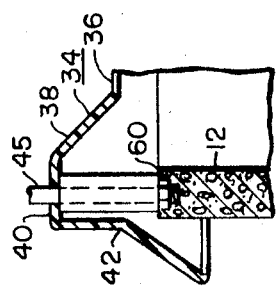

PROTECTIVE AND COOLING COVER OR HOUSING FOR SEMIBURIED ELECTRICAL APPARATUS

BACKGROUND OF THE INVENTION

1. Field of the Invention

This invention relates to a protective and cooling cover or housing for electrical apparatus and more particularly for semiburied distribution transformers.

2. Description of the Prior Art

In underground distribution systems in the prior art, distribution transformers have been installed in vaults under ground with a grate covering the vault at ground level for providing cooling for the transformer in the vault. This type of installation does not always provide adequate cooling of the transformer. The reason for the inadequate cooling is that a low-speed wind over the grate of the transformer in a vault under ground increases the transformer to ambient thermal impedance and thus the transformer temperature, because of recirculation of air in the vault. This type of installation is exemplified by U.S. Pat. No. 2,100,721.

Transformers have also been installed partially submerged or semiburied in a vault which is installed in the ground. In this type of installation the lower part of the transformer is in the vault and the upper part or top of the transformer is above ground level. The upper part of the transformer is covered with some type of protective cover or housing. This type of installation has not been too satisfactory, since the housings or covers provided in the prior art did not provide adequate cooling of the transformer, especially when the wind velocity was low. This type of installation is exemplified by U.S. Pat. No. 2,717,275.

The housing or cover provided by this invention eliminates the objection to the prior art installations by providing a louvered housing or cover for a semisubmerged or semiburied distribution transformer, which cover adequately protects the transformer from the elements of weather, prevents tampering with the transformer by unauthorized person, and also provides adequate cooling of the transformer, even when the ambient temperature is high and the wind velocity is low.

SUMMARY OF THE INVENTION

The housing or cover for a semiburied distribution transformer as provided by this invention comprises a plurality of ringlike members each having a central opening therein. Each of the ringlike members has a downwardly extending outer portion and a downwardly extending inner portion. The housing is assembled by stacking the ringlike members with spacers between each ringlike member and with a top on top of the uppermost ringlike member. The spacers may be separate members or they may be formed integrally with the ringlike members. The top, the spacers and the plurality of ringlike members are held in assembled relationship to provide a unitary housing by a plurality of bolts which pass through the top, the spacers and each of the ringlike members.

If the cover or housing is to be installed in an area of high ambient temperature and low wind velocity the spacers between the ringlike members would be relatively long to permit a large volume of air to pass through the housing or cover. On the other hand, if the housing is to be installed in an area of low ambient temperature and high wind velocity the spacers would be relatively short to provide a small air space between adjacent ringlike members. This would provide adequate cooling for a transformer inside the housing or cover and would also prevent water, snow and sleet from entering the casing or housing.

The housing or casing provided by this invention is versatile in that it permits building of a casing or housing of any height with standard parts. If a tall transformer is inserted in the vault which requires a tall cover, such a cover may be provided by stacking more ringlike members on top of each other. This may be done with standard parts, the only additional part being required would be longer bolts to clamp the ringlike members, the spacers and the top together. This versatility feature of the casing or housing considerably reduces the cost of the casing or housing by permitting the use of the same tools to make the parts for the casing or housing for a wide range of transformer ratings.

Another important feature of the casing or housing is that the inner downwardly extending portion of the ringlike members serves the dual function to direct air downward onto the transformer in the vault and it also prevents the insertion of sticks, wire, or other potentially dangerous objects into the transformer vault by being located opposite the air inlet between adjacent ringlike members. Any object inserted into the casing or housing from the outside would have to be directed upwardly because of the downwardly extending outer portion of the ringlike member and the object would be obstructed by the inner downwardly extending inner portion of the ringlike members before it could contact the high voltage parts of a transformer installed in the vault.

The housing or casing as provided by this invention may be fabricated from suitable metal, fiberglass polyester, or cast of a suitable resin, such as epoxy.

BRIEF DESCRIPTION OF THE DRAWINGS

FIG. 2 is a side view of a top for the housing or cover as provided by this invention;

FIG. 3 is a side view of a second embodiment of a ring-type member used to construct a housing or cover as provided by this invention;

FIG. 4 is a sectional detail illustrating one method of attaching a cover or housing to a semiburied vault;

FIG. 5 is a top view of a vault illustrating the points at which a cover or housing as provided by this invention is attached thereto; and, FIG. 6 is a sectional detail taken along the line VI-VI in FIG. 5 illustrating another method of attaching a housing or cover to a semiburied vault.

DESCRIPTION OF THE PREFERRED EMBODIMENTS

Figure 1:
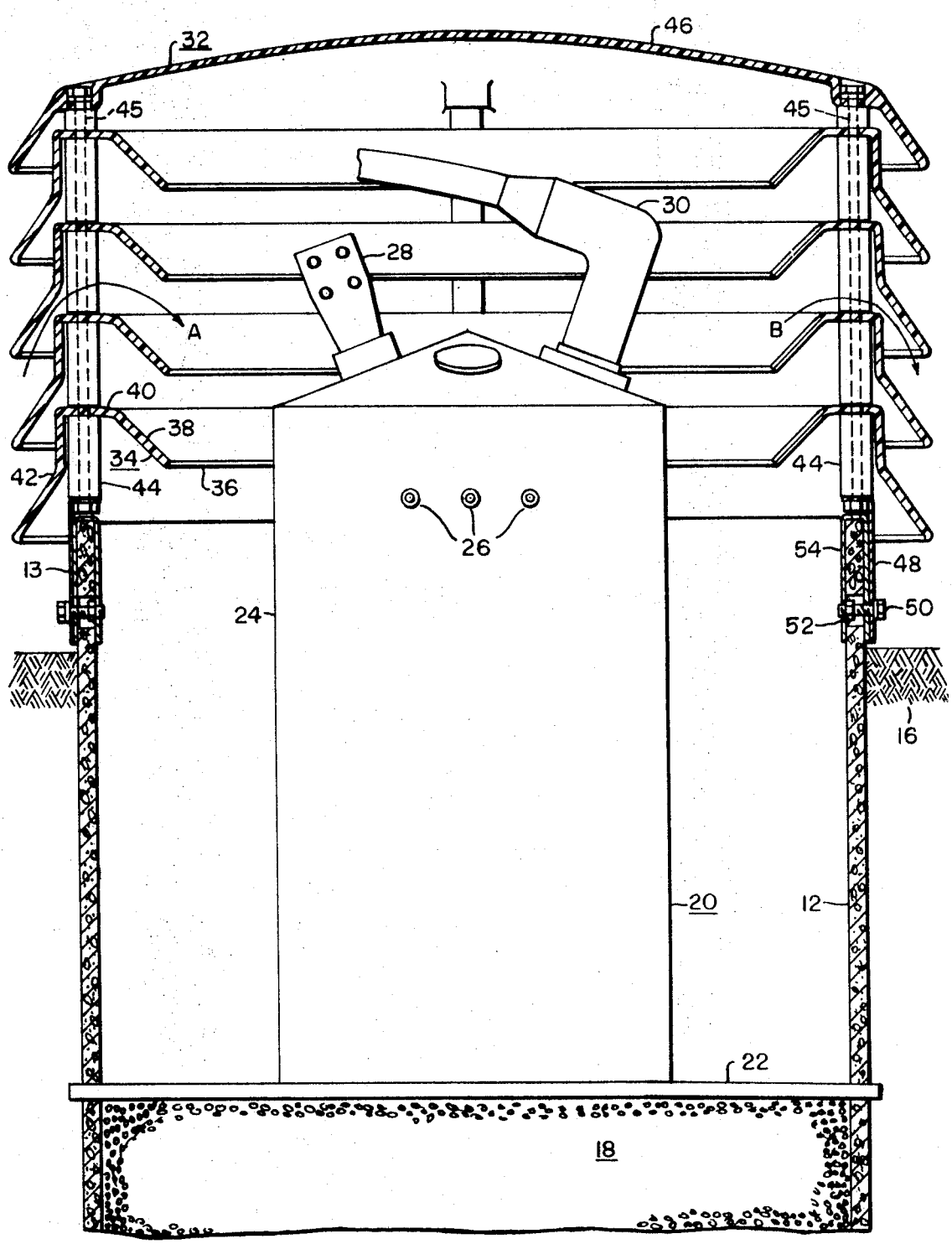
FIG. 1 is a sectional view of a semiburied transformer installation incorporating a housing or cover as provided by this invention.

Referring to the drawings in detail, FIG. 1 illustrates a sectional view of a semiburied or semisubmerged distribution transformer installation incorporating a housing or cover for the transformer as provided by this invention. The transformer installation illustrated in FIG. 1 comprises a semiburied vault 12. This vault 12 may be constructed of cast concrete or made of some asphalt material or of any other suitable material for burying in the ground. The lower portion of the vault 12 is buried in the ground and an upper portion 13 extends above the ground level. The ground level is indicated by the reference character 16. The lowest portion 18 of the vault is usually filled with gravel to provide good drainage. The distribution transformer 20 is positioned inside the vault 12. The distribution transformer is usually supported on struts 22 or some other suitable support.

The distribution transformer 20 comprises the usual core and coil arrangement enclosed in a metal tank 24. The tank 24 is provided with low voltage terminal bushings indicated schematically at 26 and a pair of high voltage terminal bushings 28 and 30. The tank 24 is usually filled with some good insulating fluid, such as a good grade of mineral oil to facilitate cooling of the transformer. As the core and coil of the transformer generates heat in the transformer, this heat is absorbed by the oil and as is well known according to the thermocycling process the hot insulating fluid rises to the top of the transformer casing 20.

As seen in FIG. 1 the top portion 13 of the vault 12 extends above the ground line 16 and the top portion of the transformer 20 on which the high voltage terminals 28 and 30 are mounted also extends above the top portion 13 of the vault 12. It thereby becomes obvious that some suitable means must be provided to cover the top portion of the transformer 20 prevent people from coming in contact therewith and becoming electrocuted; and, also to protect the transformer from elements such as rain, sleet and snow but also in the meantime permit sufficient air circulation around the transformer 20 to dissipate the heat generated in the transformer to prevent the transformer from becoming overheated and failing.

This invention has provided a new and improved housing or cover indicated generally by the reference character 32. This housing 32 comprises a plurality of ringlike members 34 having a central opening 36. Each of the ringlike members 34 comprises a downwardly extending inner portion 38, a substantially horizontal portion 40 and a downwardly extending outer portion 42. In FIG. 1 four ringlike members 34 are shown stacked one on top of the other but separated by spacer members 44. A top member 46 is provided on top of the uppermost ringlike member 34. The top member 46, the spacers 44 and the ringlike members 34 are all fastened together in a unitary assembly by bolts 45 which pass through the top member 46, the spacer members 44 and the ringlike members 34. The unitary housing or cover 32 thus provided may be attached to the vault 12, as illustrated in FIG. 1, by providing a bracket 48 which is attached to the housing 32 by the same bolts 45 which maintain the housing in assembled relationship. The housing or cover 32 may be provided with four such brackets 48 spaced at 90 apart around the lower portion of the housing or cover 32. The brackets 48 are attached to the vault 12 by means of a bolt 50 which engages a threaded member 52, which threaded member 52 is permanently attached to the vault 12 by means of a U-shaped bracket 54. The U-shaped bracket 54 and the threaded member 52 are shown in greater detail in FIG. 6. FIG. 5 illustrates four of the U-shaped brackets 54 spaced at 90° apart around the circular vault 12 for attaching the cover or housing 32, which is also circular in form, to the circular vault 12 at four points spaced 90° apart.

As stated hereinbefore each of the ringlike members 34 comprises an inner downwardly extending portion 38, a horizontal portion 40 and an outer downwardly extending portion 42. As seen in FIG. 1 the inner downwardly extending portion 38 of the ring members 34 is positioned substantially opposite the air opening between the ring members 38 as provided by the spacing members 44. It is also seen in FIG. 1 that the outer downwardly extending portion 42 of the ringlike member 34 extends below the lower point of the spacing member 44 on which the ring member 38 is mounted. The reason for this is so that water or snow or sleet will be directed downwardly and will not blow into the air opening provided between the stacked ringlike members 38 by the spacer members 44. Another reason for this downwardly extending portion 42 to extend below the lower end of the spacing members 44 is to make it more difficult for a person to insert foreign objects, such as sticks or pieces of wire, through the air space provided by the spacing members 44. In case someone does insert a foreign object upwardly under the downwardly extending portion 42 it will be obstructed by the inner downwardly extending portion 38, which is opposite the air opening provided by the spacer members 44.

An important advantage of the housing or cover 32 provided by this invention is that different height housings may be made up to accommodate different ratings of transformers merely by stacking more of the ring-shaped members 34 on top of each other. As seen in FIG. 1 the housing or cover 32 comprises four ring-shaped members 34 and a top 46. However if desired any number of ring-shaped members 34 may be used to construct the cover or housing 32. With the construction disclosed herein it is also possible to use standard parts to make up covers or housings for use in different climates. If the transformer installation is in a cold weather area, the housing or cover 32 could be constructed with a plurality of ring-shaped members 38 separated by shorter spacers than those shown in FIG. 1. However, if the transformer is installed in a hot air climate, with low wind velocity, the spacers 44 may be made longer than those shown in FIG. 1 to permit more air to pass into the transformer vault 12.

FIG. 2 is a side elevation illustrating the top 46 for a housing or cover member 32 as shown in FIG. 1. This top 46 would have an inclined top surface and would be circular in shape. The top 46 is provided with holes 50 for receiving bolts 45 for holding the cover or housing 32 in assembled relationship.

FIG. 2 illustrates a second embodiment of a ring member 52 which may be used in the same manner as the ring members 34 shown in FIG. 1 for assembling a cover or housing 32 for use with a semiburied transformer. The ring member 52, as shown in FIG. 3, comprises an inner downwardly extending portion 54 and an outer downwardly extending portion 56, but, instead of having the intermediate flat or horizontal portion 40 as shown in FIG. 1, the ringlike member 52 of FIG. 3 has four flat spots or bosses 58 provided thereon. These bosses or flat spots 58 are provided with holes for receiving the bolts 45 for assembling the ringlike members 52, the spacers 44 and the top 46 into a unitary assembly.

FIG. 4 is a detail illustrating another method of attaching the housing or cover assembly 32 to a vault 12. In this embodiment a nut 60 is embedded in the wall of the vault 12 and the bolts 45 which hold the housing or cover 32 in assembled relationship screws directly into the nuts 60 to attach the housing 32 to the top of the vault 12.

Tests have shown that with an installation such as illustrated in FIG. 1 that with still air conditions the semiburied transformer using the housing or cover 32 as disclosed herein accomplishes 7 percent greater heat transfer from the transformer than a completely buried transformer having a grate over the top of the vault. In addition, the tests showed that in a 2.7 mile per hour wind the housing cover 32 as disclosed herein admits 55 percent greater heat transfer from the semiburied transformer than from a transformer completely buried with an open grate over the top of the transformer. The reason for this is that a low-speed wind over the grate of a completely submerged or buried transformer increases the transformer to ambient thermal impedance and thus the transformer temperature, because of recirculation of air in the vault. On the other hand, a semiburied transformer equipped with a housing or cover 32 as disclosed herein recovers wind dynamic pressure on its upstream side and pumps air into the vault, increasing its cooling performance.

As seen from the drawings, the cover or housing 32 provided by this invention is round and thus regardless of what direction the wind comes from permits the housing to recover dynamic pressure on its upstream side and exhaust air on its downstream side. This air passing through the vault 12 will absorb and carry away heat from the transformer thus providing efficient cooling of the transformer. This action is indicated by the arrows in FIG. 1; where arrow A indicates the incoming air and arrow B indicates air being pumped out of the vault 12.

From the foregoing description taken in connection with the drawings it is seen that this invention has provided an efficient and economical cover or housing for a semiburied transformer which protects the transformer from weather or tampering and also provides efficient cooling of the transformer. The cover or housing as provided by this invention permits the use of standard parts to assemble covers or housings for transformers of many different ratings.

I claim:

1. A housing for protecting and cooling a transformer, said housing comprising a plurality of ringlike members, each of said ringlike members having a central opening, each of said ringlike members comprising a downwardly extending inner portion adjacent said central opening, each of said ringlike members having a downwardly extending outer portion, said downwardly extending outer portion and said downwardly extending inner portion being connected by a substantially horizontal portion, each of said ringlike members having at least one hole in said substantially horizontal portion, said ringlike members being stacked upon each other with spacer members therebetween to provide air openings into said housing between said ringlike members, said spacer means positioned on said horizontal portion of said ringlike members, a top member for said ringlike members, and fastening members extending through said at least one hole in said substantially horizontal portions of each of said ringlike members and connecting to said top member to maintain said ringlike members and said top member in assembled relationship to provide a unitary assembly, said downwardly extending inner portion of said ringlike members being substantially opposite said air openings on the inside of said housing to direct air entering said housing downwardly.

2. The housing of claim 1 wherein said means for securing said top member to said ringlike members comprises a plurality of holes in each of said ringlike members and a plurality of bolts connected to said top member and extending through said holes in each of said ringlike members.

3. The housing of claim 2 wherein said bolt extends through said spacer members.

4. The housing of claim 1 wherein the spacer members between each pair of ringlike members are the same length to provide equal spacing between adjacent ringlike members.

5. The housing of claim 1 wherein the spacer members between at least one pair of ringlike members is of different length than the spacer members between at least one other pair of ringlike members to provide at least two different size air spaces between adjacent ringlike members.

6. The housing of claim 1 wherein said ringlike members and said top member are made of fiber glass polyester.